United States Patent [19]

Vinson et al.

[11] Patent Number: 4,985,119

[45] Date of Patent: Jan. 15, 1991

[54] CELLULOSE FIBER-REINFORCED STRUCTURE

[75] Inventors: Kenneth D. Vinson, Germantown; Byron J. L. Huff, Memphis, both of Tenn.

[73] Assignee: The Procter & Gamble Cellulose Company, Memphis, Tenn.

[21] Appl. No.: 348,744

[22] Filed: May 8, 1989

Related U.S. Application Data

[63] Continuation of Ser. No. 69,462, Jul. 1, 1987, abandoned.

[51] Int. Cl.$^5$ ................... D21F 11/00; D21H 17/00
[52] U.S. Cl. .................... 162/149; 162/141; 162/181.4; 162/181.6; 162/181.7; 106/609; 106/731; 106/737
[58] Field of Search ............... 162/181.4, 181.6, 141, 162/149, 100, 181.7; 106/99, 115, 93

[56] References Cited

U.S. PATENT DOCUMENTS

| 3,062,669 | 11/1962 | Dilnot | 106/93 X |
|---|---|---|---|
| 3,085,927 | 4/1963 | Pesch | 162/55 |
| 3,340,138 | 9/1967 | Braun | 162/28 |
| 3,352,745 | 11/1967 | Malm | 162/55 |
| 3,438,853 | 4/1969 | Haines et al. | 162/181.6 X |
| 3,591,448 | 7/1971 | Elmendorf | 161/164 |
| 3,625,934 | 12/1971 | Rinse | 260/97.5 |
| 3,719,513 | 3/1973 | Bragg et al. | 106/115 X |
| 3,753,749 | 8/1973 | Nutt | 106/99 X |
| 3,827,895 | 8/1974 | Copeland | 106/99 |
| 3,841,885 | 10/1974 | Jakel | 106/99 X |
| 4,132,555 | 1/1979 | Barrable | 106/90 |
| 4,149,550 | 4/1979 | Green et al. | 131/341 |
| 4,263,049 | 4/1981 | Hansen et al. | 106/93 |
| 4,373,957 | 2/1983 | Pedersen | 106/93 |
| 4,423,112 | 12/1983 | Luthringshauser et al. | 428/389 |
| 4,529,663 | 7/1985 | Lancaster et al. | 162/181.6 X |
| 4,637,860 | 1/1987 | Harper et al. | 162/181.6 X |
| 4,647,505 | 3/1987 | Blackie et al. | 428/396 |

Primary Examiner—David A. Simmons
Assistant Examiner—Thi Dang
Attorney, Agent, or Firm—Thomas J. Slone; Larry L. Huston; Fredrick H. Braun

[57] ABSTRACT

A cellulose fiber-reinforced structure useful for building and construction made from a composition including a water-curable, inorganic binder capable of setting to form a matrix and pulped softwood fibrous material having enhanced levels of summerwood fibers.

18 Claims, No Drawings

CELLULOSE FIBER-REINFORCED STRUCTURE

FIELD OF INVENTION

This invention relates to cellulose fiber-reinforced structures and more particularly to structures of water-curable inorganic binders reinforced with cellulose fibers.

BACKGROUND OF THE INVENTION

It is well known to make fiber-reinforced structures and building materials from water-curable inorganic binders, such as cement and calcium silicate, and asbestos fibers. The use of asbestos fibers, however, has become disfavored due to safety and health concerns. It has been proposed to replace asbestos fibers with natural cellulosic fibers such as softwood fibers, hardwood fibers, and a variety of vegetable fibers such as hemp, flax, and bagasse. While the properties of such fiber-reinforced structures are generally satisfactory, it is desirable to increase the strength and toughness of such structures or otherwise reduce the quantity of fibers needed to attain certain levels of strength and toughness. Accordingly, it is an object of this invention to provide a cellulose fiber-reinforced structure and process for making it wherein cellulose fiber-reinforced structures having improved toughness and strength are obtained relative to prior known cellulose fiber-reinforced structures.

SUMMARY OF THE INVENTION

It has been surprisingly found that cellulose fiber-reinforced structures which have improved strength and toughness relative to prior known cellulose fiber-reinforced structures at constant fiber addition level are provided by reinforcing the structure with softwood fibrous material which comprise a proportion of summerwood fibers which exceeds that level which occurs naturally for the particular species of softwood fibers. Accordingly, the cellulose fiber-reinforced structure of the present invention can be described as a matrix of a water-curable, inorganic binder having distributed therein between about 2% and about 15% of pulped, softwood fibrous material, based upon the total weight of the nonhydrated components of the structure, wherein the fibrous material has a summerwood fiber content of at least the minimum number percentage indicated by the following equations:

(1) SuW (minimum) = [1.6 (C) + 17.0], for C less than or equal to 30; and (2) SuW (minimum) = 65, for C greater than 30;

wherein SuW (minimum) corresponds to the minimum percentage of summerwood fibers based upon the total number of softwood fibers and C corresponds to the coarseness index of the softwood fibrous material. Springwood fibers make up the remainder of the softwood fibrous material such that the total of the percentages of summerwood softwood fibers and springwood softwood fibers incorporated into the matrix is one hundred percent (100%).

Preferably, the percentage of summerwood fibers incorporated in the softwood fibrous material into the inorganic binder matrix is at least about 65%, more preferably at least about 70%, and most preferably at least about 85%.

The product of the present invention is useful for a variety of building material purposes, including slabs, blocks, pipes, pipe sections, and other shaped articles, albeit it is not intended to limit the present invention to these exemplary applications. The product of the present invention is especially suitable for building and general construction purposes. The present invention, including the product and the process for making it, is described in detail below.

DETAILED DESCRIPTION OF THE INVENTION

Inorganic binders useful for the present invention include water-curable inorganic substances which form a matrix upon a setting, such as cementitious materials, calcium silicate materials, and mixtures thereof.

As used herein, cementitious materials refers to compositions generally comprising lime, alumina, silica, and iron oxide. Applicable cementitious materials include Portland cement, aluminous cement, blast furnace cement, and mixtures thereof. Portland Cement is especially contemplated for use with the present invention. In general, Portland cement is composed primarily of tetracalcium aluminoferrate (4 $CaO.Al_2O_3 \cdot Fe_2O_3$), tricalcium aluminate (3 $CaO.Al_2O_3$), tricalcium silicate (3 $CaO.SiO_2$), and dicalcium silicate ($2CaO.SiO_2$). Each of the five conventional types of Portland cement and white Portland cement may be used as the inorganic binder. These include moderate heat-of-hardening cement known in the art as Type II, high early strength (H.E.S.) cement known as Type III, low heat cement known as Type IV, and chemical resisting cement known as Type V. Especially contemplated is Type I cement which commonly used for a variety of general construction purposes. It is within the ability of one of ordinary skill in the art to modify and adjust the relative proportions of the components of Portland cement in order to enhance a particular property or prepare any of the conventional types of Portland cement, including white Portland cement, listed above.

As used herein, calcium silicate material refers to any water-curable matrix forming binder made of a combination of a silicious component, i.e., a component containing silica such as PFA, quartz, sand, clay, and diatomite, and a calcerous component, i.e., minerals, raw materials, etc. containing at least about 30% CaO, such as lime.

Cellulose fibrous materials to be used for the present invention are softwood fibers, i.e, cellulosic fibers from coniferous trees. Exemplary, though not exclusive, types of softwood are slash pine, jack pine, white spruce, logepole pine, redwood, and douglas fir. North American southern softwoods and northern softwoods may be used, as well as softwoods from Western United States, Scandinavian and tropical climate regions.

The softwood fibrous material may be prepared from its natural state by any pulping process including chemical pulping processes, mechanical pulping processes, thermomechanical pulping processes and chemithermomechanical pulping processes. Preferably, the fibrous material is prepared by a chemical pulping process, such as a Kraft or sulfite pulping process. In particular the Kraft process is especially preferred. Preferably the fibrous material is sufficiently pulped to reduce the lignin content of the fibers to a level corresponding to Kappa number of less than about 20, most preferably between about 15 and about 20. Kappa numbers discussed or referenced herein are determined according to Tappi Method T-236-OS76. Optionally, the pulp may be bleached to lignin content as low as zero but such bleaching is not preferred due to cost and fiber degradation. Structures made with softwood fibrous material in accordance with the present invention, wherein the Kappa number is within the preferred range, have been found to have higher peak flexural strength and lower flexural toughness than structures made from the same type and quantity of fibrous material having higher Kappa number lignin content and hence Kappa number of the fibrous material may be reduced in accordance with conventional or other pulping and bleaching technology for certain applications.

Filler materials may also be present in the inorganic binder/softwood fibrous material composition. When present, filler materials softwood preferably are present in quantities less than 50% of the total weight of the solids content of the composition. Typical fillers include, but are not limited to, granular, cellular, and fibrous fillers such as perlite, mica, vermiculite, kieselguhr, clays and clay wastes, carbonates such as chalk, dolomites, magnesium carbonate, a variety of calcium silicate fillers, e.g., wollastonite, synthetic organic fibers such as polyvinylalcohol, synthetic inorganic fibers such as glass and mineral wool fibers, and non-softwood, fibrous cellulosic material.

The softwood fibrous material used in the present invention is prepared in such a way to increase the proportion of summerwood fibers to springwood fibers at least beyond that level which occurs in the stems of softwood trees. It has been found that increasing the proportion of summerwood fibers to springwood fibers in fibrous material used to reinforce matrices of inorganic water-curable binders results in improved absolute strength and improved toughness relative to matrices reinforced with the same weight of fibrous material having lower ratios of summerwood fibers to springwood fibers, i.e. lower number percentages of summerwood fibers based upon the total number of softwood fibers.

The distinctions between summerwood fibers and springwood fibers are well known to those skilled in the art, and each type of fiber from a particular species of softwood can be readily visually identified by those skilled in the art. It should be recognized that summerwood fibers are characterized by thick fiber walls and high ratios of wall thickness to total fiber width relative to springwood fibers. In quantitative terms, representative dry fiber average wall thicknesses of summerwood are generally between about 7 microns (White spruce, logepole pine) and about 12 microns (slash pine) whereas the corresponding springwood thicknesses are generally between about 3 microns and about 4 microns respectively. Representative ratios of dry fiber average wall thickness to dry fiber average width for softwood fibers (hereinafter "wall thickness to fiber width ratio") in general will be in excess of 0.2 for summerwood fibers, whereas dry fiber average wall thickness to dry fiber average width ratios for springwood fibers are generally less than about 0.1. For the purposes of this invention softwood fibers having wall thickness to fiber width ratios equal to or in excess of 0.2 shall be considered summerwood fibers.

The proportions of summerwood fibers and springwood fibers naturally occurring in softwood fibrous material varies with species. The coarseness of softwood fibrous material, wherein coarseness is defined as fiber weight per unit length also varies with species. Both summerwood fiber content and coarseness of fibers can affect the strength and toughness of cellulose fiber-reinforced structures.

Insofar as both coarseness and summerwood fiber percentage are both significant parameters of cellulose fiber-reinforced structures, the scope of the present invention can be defined in terms of coarseness and summerwood fiber number percentage of the fibrous material. Table I discloses coarseness index and summerwood fiber number percentage (i.e., percentage of summerwood fibers based upon the total number of fibers) for a variety of softwood fibrous materials. Summerwood fiber content was determined based upon visual analysis of the fibers. Fiber coarseness was determined according to a procedure based upon a method for measurement of pulp coarseness disclosed by Kenneth Britt in his article titled "Fiber Coarseness In Wood," Tappi Journal, May 1966, Vol. 49, number 5, pp 202–206, hereby incorporated by reference into this disclosure. The experimental procedure is described in detail in the section below titled "Experimental Procedure For Determination Of Fibrous Material Coarseness." The summerwood content may vary from sample to sample, even for the same species. However, the values listed in Table I reflect statistically representative maximum values for the respectively listed species.

TABLE I

| Fibrous Material | Coarseness Index | Summerwood Content % |
|---|---|---|
| White Spruce (slab chips) | 14 | 38 |
| Redwood | 28 | 37 |
| Tropical Pine | 31 | 36 |
| Douglas Fir | 38 | 46 |
| Slash Pine | 29 | 59 |

Table I lists softwood species having naturally occurring coarseness and summerwood fiber content substantially encompassing the entire spectrum of softwood species previously used to reinforce inorganic binder matrices in that softwood fibrous material having coarseness index as low as 14 previously used for reinforcement would have summerwood content no more than the 38% listed for North American white spruce slab chip pulp. Similarly, pulp from softwood species (including tropical species) of any naturally occurring coarseness would not have statistically significant summerwood fiber contents significantly in excess of the 59% listed for southeast U.S. slash pine pulp. Pulps having coarseness between these extremes would not have summerwood fiber contents in excess of a line connecting said summerwood fiber contents on a plot of summerwood fiber content versus coarseness index. The present invention can be conveniently described in terms of the following empirical equations which define the minimum preferred level of summerwood fibers for softwood fibrous material used to reinforce the structures of the present development:

(3) SuW (minimum)=[1.6 (C)+17], for C less than or equal to 30; and (4) SuW (minimum)=65, for C greater than 30;

wherein SuW (minimum) is percentage of softwood summerwood fibers based upon the total number of softwood fibers and C is coarseness index. The line defined by Equations (3) and (4) has, of course, been set to require that the minimum summerwood fiber content for any particular coarseness index be significantly in excess of the white spruce, slash pine, and other species listed in Table I.

Preferably, the softwood fibrous material of any coarseness has a fiber number percentage of at least about 65% and a corresponding number percentage of springwood fibers of no more than about 35%. More preferably, the softwood fibrous material has a summerwood fiber number percentage of at least about 70% and a springwood fiber number percentage of no more than about 30%. Most preferably, the summerwood fiber number percentage is at least about 85%, and the springwood fiber number percentage is no more than about 15%.

As summerwood fiber content of a particular sample of fibrous material is increased, the coarseness index of that sample will also increase. Whether the increase in summerwood fiber content of fibrous material is sufficient to bring said summerwood fiber number percentage within the scope of this invention can be determined by first determining the coarseness index of the modified sample of softwood fibrous material, then determining the number percentage of summerwood fibers in the sample, and then ascertaining whether that percentage is below the line defined in equations (3) and (4).

The preferred method for obtaining fibrous material having high levels of summerwood fibers is by centrifugal fractionation of an aqueous pulp slurry of the fibrous material. Suitable equipment and processes for this purpose are described in U.S. Pat. No. 3,085,927, A. W. Pesch, issued Apr. 16, 1963 and U.S. Pat. No. 3,352,745, G. E. Malm, issued Nov. 14, 1967, both of which are incorporated by reference into this disclosure. An alternate preferred method for obtaining fibrous having the high levels of summerwood fibers as contemplated herein is by wood fractionation, e.g., selecting specific parts of the tree, which have high summerwood content relative to the tree stem as a whole. Another alternative method is to mechanically separate the age rings of the tree stem. By discarding all or part of the wood corresponding to the "light rings", i.e., the springwood, fibrous material having increased percentages of summerwood fibers can be obtained. Still other methods include floatation separation methods such as that disclosed in U.S. Pat. No. 3,340,138, R. V. Braun, issued Sept. 5, 1967, incorporated herein by reference.

Preferably, the cellulose fiber-reinforced structures of the present invention have incorporated therein between about 2% and about 15% of softwood fibrous material, based upon the total weight of the nonhydrated components of the structure. More preferably, between about 4% and about 12% of softwood fibrous material, based upon the nonhydrated solids weight, is incorporated into the structure.

At least about 4% softwood fibrous material preferred since that is the approximate minimum level of fibrous material believed to be incorporated in conventional cellulose fiber-reinforced structures. Also, conventional cellulose fiber-reinforced structures generally have softwood fibrous material levels of no more than about 15%, most often no more than about 12%.

In one preferred embodiment, the fibrous material is length fractionated to separate the shorter length fibers from the fibrous material incorporated into the reinforced structure. It has been found that fibrous materials with longer average fiber lengths impart higher absolute strength and flexural toughness than the same total weight of fibrous material which has not been length fractionated. Any method known in the art may be practiced for length fractionation. One method found to be useful is fractionation with a vibratory screen.

In the manufacture of cellulose fiber-reinforced structures from water-curable inorganic binders, it is normal practice to first form an aqueous slurry of the softwood fibrous material and mix the inorganic binder therein. Alternatively, the inorganic binder may be slurried prior to or concurrently with addition of the softwood fibrous material. The slurry may contain additional material such as, but not limited to the filler materials described above. The slurry will normally have a total solids content of from about 3% to about 20%, although the solids content may be outside this range. The slurry may then be formed into slabs, boards, or any other desired shape by any process for making such structures with inorganic binders. These processes include, but are not limited to: (a) the Hatshek process, (b) the Magnani process, (c) the use of a simple press, and (a) a Fourdrinier process. Generally, these processes involve at least partial dewatering of the slurry in order to facilitate handling. After the mixture containing the inorganic binder and softwood fibrous material has been formed into the desired shape, the inorganic binder is allowed or caused to cure to form a matrix. Exemplary methods for curing the inorganic binder include autoclaving, air curing, and steam heating at 80° C. to 90° C. followed by maturation at room temperature or at elevated temperature, preferably at high humidity.

It is especially preferred that cementitious inorganic binders set by autoclaving have silica in the form of powder sufficiently ground to pass through a 200 mesh screen. Between about 30% and about 50% silica based upon the solids weight of the cement, is preferably added.

Reinforced structures which have been cured by autoclaving have been found to have especially large increases in strength and toughness due to increases in summerwood fiber percentage.

The following examples are presented for the purpose of illustrating the invention. They are not to be interpreted as limiting the present invention, the scope of which is defined in the claims. All percentages are weight percentages unless otherwise specifically indicated, except for percentages relating to the level of summerwood fibers, which percentages relate to a number percentage of summerwood fibers based upon the total number of softwood fibers, hereinafter referred to as "fiber number percentages".

PROCEDURE FOR DETERMINING COARSENESS INDEX

The following procedure was used to determine the coarseness index of fibrous material: (1) disintegrate 0.3500 g, bone dry weight, of fibrous material for five minutes in two liters of distilled water with a Tappi disintegrator; (2) dilute the fibrous material slurry to four liters, i.e., fiber consistency, weight basis, of 0.00875%; (3) form a Tappi handsheet having a basis weight of 1 g/m$^2$ on a 100 mesh screen and air dry the handsheet; (4) lay the sticky surface of a strip of 1.27 cm (i.e., 0.5 inch) wide transparent tape on the handsheet across the length of the screen and press the tape toward the screen; (5) peel the tape from the screen and press the tape on a dry, glass microscope slide that is seven centimeters in length; (6) mount the slide in a 100× magnification microscope having an eyepiece with a pointer or cross-hair; (7) count the number of fibers intersected by the end of the pointer or middle of the cross-hair upon making a complete traverse of the length of the tape on the slide, said length being seven centimeters; single fibers which intersect the end of the pointer or middle of the cross-hair more than once are only counted once; and (8) calculate coarseness index, C, according to Equation (5) below:

$$C = \frac{2}{\pi} \cdot 1000 \cdot \frac{(WL)}{N};\tag{5}$$

wherein:
W=basis weight of the sheet;
L=length of the slide; and
N=number of fibers counted.

EXAMPLE I

This example shows that improvements in both peak flexural strength and flexural toughness of fiber reinforced structures are obtained by substituting high summerwood content softwood fibrous material for conventional summerwood level content softwood fibrous material in inorganic binder matrices.

Sample cellulose fiber-reinforced structures were prepared as follows Kraft pulped, fully bleached slash pine southern softwood was utilized. The control samples had fibrous material with a summerwood fiber content of about 55%. Summerwood fiber content was increased to the desired level of about 86% by centrifuging. The fibrous material was added to a sufficient amount of water and mixed with a Waring blender to form a 2% by weight fiber in water slurry. A retention aid, Percol 90L, an anionic polyacrylamide procured from Allied Colloids Company (Suffolk, Virginia), was then added to the slurry and the slurry was again mixed in the Waring blender. The inorganic binder was next added to the slurry. An appropriate amount of inorganic binder was added to provide the desired fibrous material concentration, based upon the total nonhydrated weight of the final product. The inorganic binder for air-cured structures was substantially 100% Type I cement (ASTM C150). The inorganic binder for autoclaved structures was about 60% Type I cement and about 40% powdered silica sufficiently ground to pass through a 200 mesh screen. The fibrous material and inorganic binder was mixed to form a binder composition in the Waring blender and poured into a flat mold designed to allow water to drain through a foraminous bottom. Additional water was removed through the bottom of the mold by a vacuum apparatus. The composition was subjected to 1,000 psi for three minutes. The composition was then removed and the inorganic binder was set by autoclaving or air-curing, to form an inorganic binder matrix. The resulting structure wa then cut into three identically sized 6 inch by 1.7 inch rectangles each rectangle being approximately 0.2 inches in depth. A total of six of these rectangular structures were prepared for each test.

The samples which were autoclaved were cured in a pressure vessel for eight hours with 150 psig saturated steam and then dried for two days at ordinary room temperature and humidity. The structures which were air-cured were cured at room temperature at 100% humidity for a period of seven days.

Peak flexural strength and flexural toughness were determined by the Third Point Flexural Test method. The sample was deflected at a rate of 0.5 inches per minute. The peak flexural strength as indicated by the modulus of rupture (MOR), was calculated according to equation (6):

$$MOR = \frac{P \cdot L}{Bd^2}\tag{6}$$

wherein P is peak load, L is the span between the two outermost nodes during the test, B is the width of the structure, and d is the depth of the structure.

The flexural toughness, was determined by integrating the total area of the curve of applied load versus time. This value was then normalized by multiplying it by $(L/Bd^2)$ wherein the variables are the same as represented as in Equation 6. The resulting quantity is referred to herein as the toughness index.

Tables II and III below show data obtained for structures reinforced with both fibrous material having a naturally occurring level of summerwood fibers for slash pine (55%) and fibrous material having 86% summerwood fibers for fibrous material levels of 4%, 8%, 10%, and 12%, based upon the total of the structure. Slash pine from southeastern U.S. was the species of softwood fibrous material. Summerwood fiber percentage was increased by centrifugal fractionation. Results are shown for both autoclaved and air-cured structures. Six separate rectangular structures were strength and toughness tested for each fibrous material level and freeness level of the fibrous material. Each fibrous material level was tested using fibers with freeness levels of 325 ml CSF, 500ml CSF, 650 ml CSF, and unrefined. Freeness level was found to have no substantial effect on the improvement of peak flexural strength and flexural toughness increases observed due to increased summerwood fiber content. Each datum point reported in Tables II and III hereinafter, represents the average of the results for all of the freeness levels tested at a particular level of fibrous material and summerwood content.

TABLE II

| Fibrous Material Content (%) | Summerwood Fiber Level % | Dry MOR Autoclave (M Pa) | Dry Toughness Index Autoclave | Dry MOR Air-Cure (M Pa) | Dry Toughness Index Air-Cure |
|---|---|---|---|---|---|
| 4 | 55 | 17.17 | 2.15 | 13.92 | 4.44 |
|   | 86 | 17.12 | 2.27 | 14.13 | 6.16 |
| 8 | 55 | 19.89 | 4.32 | 19.12 | 10.97 |
|   | 86 | 21.75 | 5.15 | 18.57 | 14.18 |
| 10 | 55 | 21.72 | 6.76 | 19.41 | 15.91 |
|    | 86 | 23.68 | 8.23 | 19.89 | 18.44 |
| 12 | 55 | 23.40 | 9.61 | 20.50 | 21.71 |
|    | 86 | 25.09 | 12.59 | 21.18 | 25.28 |

TABLE III

| Fibrous Material Content (%) | Summerwood Fiber Level % | Wet MOR Autoclave (M Pa) | Wet Toughness Index Autoclave | Wet MOR Air-Cure (M Pa) | Wet Toughness Index Air-Cure |
|---|---|---|---|---|---|
| 4 | 55 | 13.12 | 3.04 | 9.07 | 7.08 |
|   | 86 | 13.53 | 3.34 | 9.53 | 7.63 |
| 8 | 55 | 14.76 | 7.62 | 10.72 | 22.35 |
|   | 86 | 16.04 | 11.10 | 11.64 | 24.78 |
| 10 | 55 | 15.49 | 12.48 | 11.11 | 28.37 |
|    | 86 | 17.18 | 19.53 | 12.16 | 33.75 |
| 12 | 55 | 16.68 | 19.98 | 11.15 | 33.33 |
|    | 86 | 17.80 | 24.44 | 11.81 | 35.91 |

It can be understood from the information disclosed in Tables II and III, that substantial increases in peak flexural strength and flexural toughness are obtained by substituting high summerwood content softwood fibrous material for the same weight of conventional summerwood content fibrous material. Especially large strength and toughness results are obtained when the fiber reinforced structure is set by autoclaving.

EXAMPLE II

This example shows the effect of Kappa number on peak flexural strength and toughness.

Autoclaved samples of cellulose-reinforced structures were prepared as described in Example I with 12% slash pine fibrous material, based upon the total solids weight of the structure. The fibrous material had a summerwood fiber number percentage of about 78%. Fibrous material was tested at Kappa number levels of 68.5, 27.4, and 15.6. Kappa number was varied by conventional adjustments to standard Kraft pulping and bleaching procedures. The results, shown in Table IV, show that reduced Kappa number leads to increased peak flexural strength and decreased flexural toughness.

TABLE IV

| Kappa No. | Dry MOR (M Pa) | Wet MOR (M Pa) | Dry Toughness Index | Wet Toughness Index |
|---|---|---|---|---|
| 68.5 | 27.24 | 19.38 | 38.60 | 55.30 |
| 27.4 | 29.04 | 20.10 | 28.30 | 46.00 |
| 15.6 | 29.68 | 23.46 | 27.63 | 45.62 |

What is claimed is:

1. A process for making a cellulose-fiber-reinforced structure, said process comprising the steps of:
    a. mixing a water-curable inorganic binder with water and between about 4% and 15% pulped softwood fibrous material, based upon the total solids of said structure, wherein said fibrous material has a summerwood fiber number percentage at least the minimum summerwood fiber number percentage provided by the equations:
    SuW (minimum)=for C less than or equal to 30; and
    SuW (minimum=65, for C greater than 30;
    wherein SuW (minimum is minimum number percentage of summerwood fibers based upon the total number of fibers, and C is fibrous material coarseness index; and
    b. curing said mixture.

2. The process of claim 1 wherein said summerwood fiber number percentage is at least about 85%.

3. The process of claim 2 wherein said water-curable inorganic binder is a cement binder.

4. The process of claim 3 wherein said cement binder comprises between about 50% and 100% portland cement and between 0% and about 50% silica.

5. The process of claim 1, or 4 wherein the step of curing said mixture comprises an autoclave process.

6. The process of claim 1 wherein said fibrous material has a summerwood fiber number percentage of at least about 70%.

7. The process of claim 1 wherein said water-curable inorganic binder is cement binder.

8. The process of claim 1 wherein said water-curable inorganic binder is a calcium silicate binder.

9. The process of claim 1 wherein said fibrous material has a Kappa number of from about 15 to about 20.

10. A cellulose-fiber-reinforced structure comprising:
    a. a matrix of a water-curable, inorganic binder; and
    b. between about 4% and about 15% of pulped softwood fibrous material, based upon the total weight of nonhydrated components of said structure, said fibrous material having a summerwood fiber number percentage of at least the minimum summerwood fiber percentage provided by the equations:
    SuW (minimum)=for C less than or equal to 30; and
    SuW (minimum)=65, for C greater than 30;
    wherein SuW (minimum) is number percentage of summerwood fibers based upon the total number of softwood fibers, and C is fibrous material coarseness index.

11. The cellulose-fiber-reinforced structure of claim 10 wherein said fibrous material has a summerwood fiber number percentage of at least about 70%.

12. The cellulose-fiber-reinforced structure of claim 10 wherein said summerwood fiber number percentage is at least about 85%.

13. The cellulose-fiber-reinforced structure of claim 10, 11, or 12 wherein said structure comprises between about 4% and about 12% softwood fibrous material, based upon the total weight of nonhydrated components of said structure.

14. The cellulose-fiber-reinforced structure of claim 10 wherein said structure comprises between about 4% and about 12% softwood fibrous material, based upon the total weight of nonhydrated components of said structure.

15. The cellulose-fiber-reinforced structure of claim 10 wherein said water-curable, inorganic binder is a cement binder.

16. The cellulose-fiber-reinforced structure of claim 10 wherein said water-curable, inorganic binder is a calcium silicate binder.

17. The cellulose-fiber-reinforced structure of claim 15 wherein said cement binder comprises between about 50% and 100% portland cement and between 0% and about 50% silica.

18. The cellulose-fiber-reinforced structure of claim 10, 11, 12, or 17 wherein said fibrous material has a Kappa number of from about 15 to about 20.

* * * * *

UNITED STATES PATENT AND TRADEMARK OFFICE
CERTIFICATE OF CORRECTION

PATENT NO. : 4,985,119
DATED : Jan. 15, 1991
INVENTOR(S) : Kenneth D. Vinson & Byron J. L. Huff It is certified that error appears in the above-identified patent and that said Letters Patent is hereby corrected as shown below:

Column 2, line 21 "$CaO.Al_2O_3.\ Fe_2O_3$" should be --$CaO.Al_2O_3.Fe_2O_3$--.

Column 2, line 23 "$CaO.\ SiO_2$" should be --$CaO.SiO_2$--.

Column 2, line 31 after "which" insert --is--.

Column 8, line 22 after "total" insert --solid weight--.

Signed and Sealed this

Thirteenth Day of July, 1993

Attest:

MICHAEL K. KIRK

*Attesting Officer*    *Acting Commissioner of Patents and Trademarks*